Mar. 6, 1923.
A. V. CHYLOWSKI
TIRE VALVE
Filed Mar. 25, 1922
1,447,924
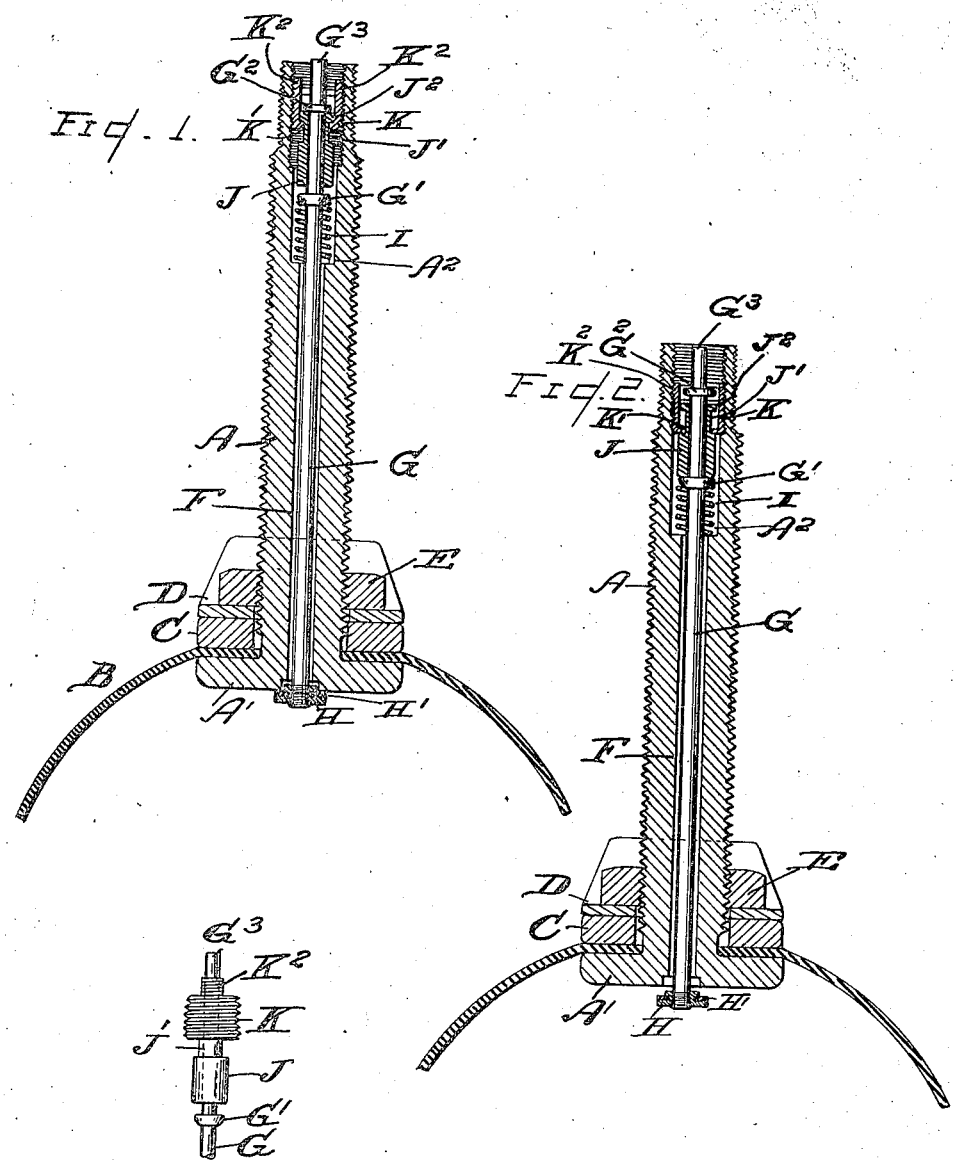

Patented Mar. 6, 1923.

1,447,924

UNITED STATES PATENT OFFICE.

ALEXANDER V. CHYLOWSKI, OF DETROIT, MICHIGAN.

TIRE VALVE.

Application filed March 25, 1922. Serial No. 546,775.

*To all whom it may concern:*

Be it known that I, ALEXANDER V. CHYLOWSKI, citizen of the United States, residing at Detroit, county of Wayne, State of Michigan, have invented a certain new and useful Improvement in Tire Valves, and declare the following to be a full, clear, and exact description of the same, such as will enable others skilled in the art to which it pertains to make and use the same, reference being had to the accompanying drawings, which form a part of this specification.

My invention relates to pneumatic tire valves shown in the accompanying drawings and more particularly described in the following specification and claims.

The primary object of this invention is to provide a valve simple in its construction and operation which when closed is perfectly air tight but may be secured in an open position for deflating the tire when required.

The invention further provides for automatically closing the valve following each operation of the pump when filling the tire with air that the air may not escape and also for opening the valve sufficiently when required to secure a pressure gauge reading.

A further object of the invention is to provide a construction in which the closure elements may be readily installed in valve housings now in use in place of the valve parts ordinarily installed therein whereby the advantages gained by the use of the closure elements herein described may be obtained at a minimum cost.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a cross-sectional view of the valve in closed position, drawn on a relatively large scale to clearly disclose the construction of its several parts,—the usual closure cap screwed to the valve housing having been removed.

Figure 2 is a similar cross sectional view showing the valve forced from its seat that the pneumatic tube may be deflated.

Figure 3 is a fragmentary elevation showing the upper end of the valve stem, annular nut and bushing.

Referring now to the letters of reference placed upon the drawings:

A denotes the valve housing provided at one end with the usual disc A' overlapping a portion of the inflatable inner tube B. C indicates a washer adjacent the outer wall of the tube. D denotes the usual wing washer and E is a nut threaded on the valve housing to secure the parts to the tube. F is a central port through the valve housing A. G denotes the valve stem extending through the central port F and screwed to its lower end is a valve closure H, and H' is a rubber or fiber disc mounted thereon. G' indicates a flange integral with the valve stem. I is a spring housed in the counterbore $A^2$ at the upper end of the valve housing, bearing at one end against the shoulder formed by the counterbore and at its other end against the flange G' on the valve stem;—the action of the spring serving to automatically seat the valve. J is a bushing loosely sleeved upon the stem above the flange G'. K is an annular nut screwed in the upper end of the valve housing having an inwardly directed flange K' projecting into a relatively wide peripheral groove J' near the upper end of the bushing J. $J^2$ is a flange at the end of the bushing overlapping the inwardly directed flange K' of the nut to couple the nut and bushing together while permitting the parts to rotate independently of each other. $G^2$ is a flange integral with the stem overlapping the flange at the upper end of the bushing J. $K^2$ are upstanding lugs integral with the nut K adapted to receive a suitable socket wrench for rotating the nut.

Having now indicated the several parts by reference letters the construction and operation of the device will be readily understood.

It will first be assumed that the tube is filled with air and that the tire is to be deflated. To effect this result the nut K is screwed downwardly by a suitable wrench adapted to engage its lugs $K^2$ so that the inwardly projecting flanges K' of the nut bear upon the shoulder of the bushing J;— the lower end of the bushing being in contact with the flange G' of the valve stem forces the valve H from its seat, as shown in Figure 2, thereby permitting the air to escape from the tube through the central port F.

Having deflated the tire the nut K is screwed outwardly, thereby permitting the valve H to seat under the urge of the spring I. The tire may now be inflated in the usual manner by making proper connection with a suitable compression pump—the valve H being raised as each stroke of the pump plunger delivers the air into the tube and is automatically closed under the action of the spring until again forced from its seat by the incoming air. When the tube has been properly inflated the valve H may be drawn to its seat by a further outward adjustment of the annular nut K,—the inwardly directed flange K' of the latter contacting with the flange J² of the bushing J, forces the bushing into contact with the flange G² of the valve stem, thereby securing the valve H upon its seat, where it is securely held until again released in the manner previously described. In order to determine the pressure of air in the tube the annular nut K is screwed downwardly sufficiently to permit the valve H being raised from its seat by pressing on the outwardly projecting end G³ of the valve stem G. After securing the gauge reading the valve is returned to its seat as before by the upward adjustment of the nut.

Having thus described my invention what I claim is:

1. In a valve of the character described, the combination of a valve housing having a central bore with a counterbore at its outer end tapped to receive a nut, a valve stem fitted at its inner end with a valve disk adapted to be seated upon the inner end of the valve housing, a bushing slidably and rotatably mounted on said stem, inner and outer annular flanges on said stem adapted to limit the sliding movement of said bushing with respect to said stem, said bushing having a peripheral groove, an annular nut screwed into the counterbored end of the valve housing having a flange extending into the peripheral groove in said bushing to slidably and rotatably couple said nut and bushing, a spring normally tending to seat said valve, said nut being adapted to be moved outwardly to carry said bushing into engagement with said outer flange to thereby tighten said valve independently of the action of said spring, and said nut being also adapted to be moved inwardly to carry said bushing into engagement with the inner flange to thereby open the valve against the action of said spring.

2. In a valve of the character described, the combination of a valve housing having a central bore with a counterbore at its outer end tapped to receive a nut, a valve stem fitted at its inner end with a valve disk adapted to be seated upon the inner end of the valve housing, a bushing slidably and rotatably mounted on said stem, inner and outer annular flanges on said stem adapted to limit the sliding movement of said bushing with respect to said stem, said bushing having a peripheral groove, an annular nut screwed into the counterbored end of the valve housing having a flange extending into the peripheral groove in said bushing to slidably and rotatably couple said nut and bushing, a spring normally tending to seat said valve, the loose connection between the annular nut and the grooved bushing permitting said bushing to be held in forcible contact with either of said flanges or held in neutral position, whereby said valve may be tightened or opened by means of said nut and bushing or may be opened independently of said nut and bushing.

In testimony whereof, I sign this specification in the presence of two witnesses.

ALEXANDER V. CHYLOWSKI.

Witnesses:
S. E. THOMAS,
JOHN CONSIDINE.